United States Patent [19]

Takahashi et al.

[11] Patent Number: 5,267,342
[45] Date of Patent: Nov. 30, 1993

[54] LIGHT ATTENUATING ELEMENT AND METHOD OF PRODUCING THE SAME

[75] Inventors: Mitsuo Takahashi; Kunio Yamada, both of Matsudo, Japan

[73] Assignee: Seikoh Giken Co., Ltd., Matsudo, Japan

[21] Appl. No.: 878,477

[22] Filed: May 5, 1992

[30] Foreign Application Priority Data

Oct. 11, 1991 [JP] Japan .................................. 3-292439

[51] Int. Cl.⁵ .............................................. G02B 6/38
[52] U.S. Cl. .......................................... 385/140; 385/66
[58] Field of Search .................. 385/56, 58, 60, 66, 385/70, 72, 73, 140

[56] References Cited

U.S. PATENT DOCUMENTS

| | | | |
|---|---|---|---|
| 4,717,234 | 1/1988 | Barlow et al. | 385/140 |
| 4,893,889 | 1/1990 | Iwakiri et al. | 385/140 |
| 5,066,094 | 11/1991 | Takahashi | 385/73 |

*Primary Examiner*—Rodney B. Bovernick
*Assistant Examiner*—John Ngo
*Attorney, Agent, or Firm*—Spencer, Frank & Schneider

[57] ABSTRACT

A light attenuating element comprising a ferrule and two optical fibers inserted through the ferrule along an optical axis thereof is disclosed. The inner ends of both the optical fibers are cut with a predetermined inclination angle and spaced from each other with a predetermined distance therebetween to obtain a required light attenuation value. A light attenuating element including an alignment sleeve into which two ferrules each having an optical fiber inserted therethrough are fitted with a predetermined distance being maintained between the foremost ends thereof is also disclosed. A method of producing a light attenuating element is practiced by way of the steps of inserting through one ferrule one optical fiber of which one end is optically connected to a light source, inserting through another ferrule another optical fiber of which one end is optically connected to a power meter, measuring a light attenuation value of the light attenuating element by the power meter, stopping the inserting operation when a required light attenuation value is obtained, cutting the optical fibers and then grinding and polishing the outer ends of the optical fibers together with the ferrules. An adaptor type optical attenuator having a light emitting element incorporated therein is disclosed. In addition, an optical connector type optical attenuator is also disclosed.

22 Claims, 5 Drawing Sheets

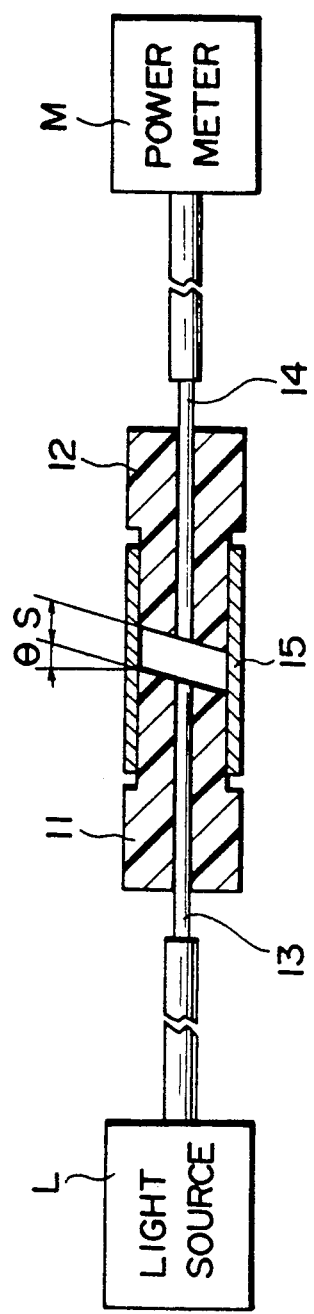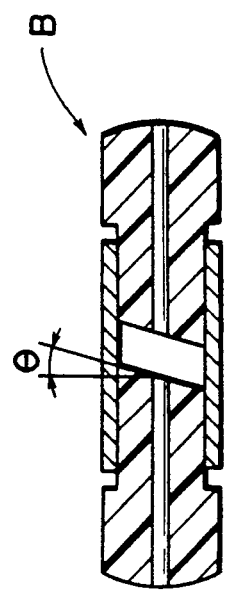

LIGHT ATTENUATING ELEMENT AND METHOD OF PRODUCING THE SAME

BACKGROUND OF THE INVENTION

1. Field of the Invention

The present invention relates generally to a light attenuating element employable for an optical fiber communication circuit system. More particularly, the present invention relates to a light attenuating element preferably employable for a stationary type optical attenuator adapted to be optically connected to an optical connector widely used in optical fiber communication circuit systems. Further, the present invention relates to a method of producing a light attenuation element of the foregoing type.

2. Description of the Related Art

Various kinds of stationary type optical attenuators have been heretofore put in practical use for the purpose of attenuating a quantity of light beam to pass through an optical fiber communication circuit network.

Among many stationary type optical attenuators, an optical connector type optical attenuator has advantages in that it can be easily handled, and moreover, it can be used within a wide range of application fields. For this reason, optical connector type optical attenuators have been hitherto widely used in many application fields.

To facilitate understanding of the present invention, typical conventional optical attenuators will briefly be described below with reference to FIGS. 5(a) and 5(b).

FIG. 5(a) is a sectional view of a conventional stationary optical attenuator, particularly illustrating the structure of the optical attenuator. The optical attenuator includes ferrules 45 and 46, and optical fibers 43 and 44 with sheathes 41 and 42 removed therefrom inserted through center holes of the ferrules 45 and 46. After completion of the inserting operation, the optical fibers 43 and 44 are immovably held in the center holes of the ferrules 45 and 46 with the aid of an adhesive. The outer end surfaces of the ferrules 45 and 46 are ground and polished together with the optical fibers 43 and 44 to assume a predetermined contour. Then, the ferrules 45 and 46 are inserted into an alignment sleeve 47 from the opposite sides of the optical attenuator, until an end surface 48 of the ferrule 45 comes in contact with an end surface 49 of the ferrule 46, whereby a series of optical signals can be transmitted through the optical fibers 43 and 44.

Next, FIG. 5(b) is a sectional view of another conventional stationary optical attenuator, particularly illustrating the structure of the optical attenuator. This optical attenuator is substantially the same as that shown in FIG. 5(a) with the exception that a glass plate 50 is interposed between both the ferrules 45 and 46. The opposite surfaces of the glass plate 50 are coated with a film having a vaporized metal deposited thereon so as to allow a predetermined light attenuation value to be obtained. Specifically, the ferrules 45 and 46 are inserted into the alignment sleeve 47 from the opposite sides of the optical attenuator such that their foremost ends come in contact with the glass plate 50 (see Light Guide Digest, Vol. 2, 1990 published by AT & T). In practice, this type of stationary optical attenuators have been hitherto mainly employed to build an optical fiber communication circuit network.

However, since a glass plate having surfaces each plated with a vaporized metal is used in the conventional optical attenuator, a light attenuation value of the optical attenuator varies depending on the thickness of each plated layer, and it is practically difficult to exactly control the thickness of each plated layer so as to obtain a specified light attenuation value. For this reason, the number of inspection steps is unavoidably increased to detect an incorrectly plated layer. Thus, when economical conditions are taken into consideration, a commercially available allowance of light attenuation value is restrictively defined to remain within the range of about ±1.5 dB. However, this level is not satisfactory and acceptable from the viewpoint of accuracy in some application fields.

In a case where ferrules are frequently attached to and detached from the alignment sleeve during practical use, there arises a malfunction that the plated layer present in the contact location is peeled from the glass substrate. Once peeling occurs, it is impossible to repair the glass plate in the optical attenuator.

Another drawback of the conventional optical attenuator is that a malfunction of so-called reflected return light loss readily arises when an optical signal is reflected at a connection plane where two optical fibers are optically connected to each other and then the optical signal returns in the direction toward the light source. However, this reflected return light loss is very harmful for a wide range optical fiber communication system such as an ISDN communication system which has been researched and developed at present. To assure that the wide range optical fiber communication system is actually realized, it is necessary that the reflected return light loss can be reduced remarkably.

In view of the fact that the reflected return light loss increases in proportion to the number of connection locations, it is inevitably essential to avoid as far as possible the interposition of a glass plate having surfaces each plated with a vaporized metal between the ferrules.

SUMMARY OF THE INVENTION

The present invention has been made with the foregoing background in mind.

An object of the present invention is to provide a light attenuating element which assures that a light attenuation value can be determined with high accuracy without a malfunction of reflected return light loss at an optical connection location.

Another object of the present invention is to provide a light attenuating element which exhibits excellent stability and durability with minimized influence of exterior environmental factors such as moisture, vibration, shock or the like.

Still another object of the present invention is to provide a light attenuating element which assures that any scratched or injured end surface of each ferrule and optical fiber can be repaired by cleaning and then re-grinding it.

A further object of the present invention is to provide a method of producing a light attenuating element of the aforementioned type.

A still further object of the present invention is to provide a stationary optical attenuator in which a light attenuating element of the aforementioned type is incorporated as a part of an optical connector.

According to a first aspect of the present invention, there is provided a light attenuating element usable for an optical attenuator wherein the light attenuating element comprises a cylindrical ferrule serving as a main body for the light attenuating element; a first optical fiber with a sheath removed therefrom, the first optical fiber being inserted through a center hole formed along a longitudinally extending optical axis of the light attenuating element from one side of the same, the inner end of the first optical fiber being cut with a predetermined inclination angle relative to a plane perpendicular to the optical axis of the light attenuating element, while the outer end of the same is ground and polished together with the ferrule to assume a predetermined contour; and a second optical fiber with a sheath removed therefrom, the second optical fiber being inserted through the center hole of the light attenuating element from other side of the same, the inner end of the second optical fiber being cut with the predetermined inclination angle and spaced away from the inner end of the first optical fiber with a predetermined distance therebetween, while the outer end of the same is ground and polished together with the ferrule to assume the predetermined contour.

In addition, according to a second aspect of the present invention, there is provided a light attenuating element usable for an optical attenuator wherein the light attenuating element comprises a cylindrical alignment sleeve serving as a holder for the light attenuating element; a first cylindrical ferrule firmly fitted into the alignment sleeve from one end of the light attenuating element; a first optical fiber with a sheath removed therefrom, the first optical fiber being inserted through a center hole formed along a longitudinally extending optical axis of the light attenuating element from the one side of the same, the inner end of the first optical fiber being cut together with the first ferrule with a predetermined inclination angle relative to a plane perpendicular to the optical axis of the first ferrule, while the outer end of the same is ground and polished together with the first ferrule to assume a predetermined contour; a second cylindrical ferrule firmly fitted into the alignment sleeve from other side of the light attenuating element, the inner end of the second ferrule being spaced away from the inner end of the first ferrule with a predetermined distance therebetween; and a second optical fiber with a sheath removed therefrom, the second optical fiber being inserted through the center hole of the second ferrule from other side of the same, the inner end of the second optical fiber being cut together with the second ferrule with the predetermined inclination angle and spaced away from the inner end of the first optical fiber with the predetermined distance therebetween, while the outer end of the same is ground and polished together with the second ferrule to assume the predetermined contour.

After completion of the inserting operation, each of the first and second fibers is immovably held in the corresponding center hole of the ferrule with the aid of an adhesive.

It is desirable that the inclination angle of each optical fiber relative to a plane perpendicular to the optical axis of the light attenuating element is set to eight degrees or more.

The predetermined distance between the inner end of the first optical fiber and the inner end of the second optical fiber is predetermined so as to allow the light attenuating element to exhibit a predetermined light attenuation value.

The opposite outer end surfaces of each ferrule are ground and polished together with the first and second optical fibers to exhibit a right angle relative to the optical axis of the light attenuating element, a predetermined inclination angle relative to the same or a convexly curved plane relative to the same.

Each ferrule is usually molded of pulverized quartz, pulverized alumina or pulverized zirconia each of which is sintered after completion of a molding operation.

According to a third aspect of the present invention, there is provided a method producing a light attenuating element constructed in accordance with the first aspect of the present invention wherein the method is practiced by way of the steps of inserting a first optical fiber with a sheath removed therefrom through a center hole formed along a longitudinally extending optical axis of a cylindrical ferrule from one side of the same, the inner end of the first optical fiber being cut with a predetermined inclination angle relative to a plane perpendicular to the optical axis of the ferrule, while the outer end of the same is optically connected to a light source; inserting a second optical fiber with a sheath removed therefrom through the center hole of the ferrule from other end of the same, the inner end of the second fiber being cut with the predetermined inclination angle and spaced away from the inner end of the first optical fiber with a predetermined distance therebetween, while the outer end of the same is optically connected to a power meter for measuring a light attenuation value of the light attenuating element; measuring the light attenuation value of the light attenuating element with the aid of the power meter in response to an optical signal output from the light source so as to continue the inserting operation for the first and second optical fibers until the light attenuation value of the light attenuating element reaches a predetermined one; interrupting the inserting operation for the first and second optical fiber to immovably hold the first and second optical fibers in the center hole of the ferrule with the aid of an adhesive when it is confirmed by the power meter that the light attenuation value of the light attenuating element has reached the predetermined one; cutting the first and second optical fibers along the opposite outer surfaces of the ferrule; and grinding and polishing the opposite outer surfaces of the ferrule together with the first and second optical fibers to assume a predetermined contour.

In addition, according to a fourth aspect of the present invention, there is provided a method of producing light attenuating element constructed in accordance with the second aspect of the present invention wherein the method is practiced by way of the steps of preparing a first cylindrical ferrule having a first optical fiber with a sheath removed therefrom inserted through a center hole formed along a longitudinally extending optical axis thereof, the first optical fiber being immovably held in the center hole of the first ferrule with the aid of an adhesive, the inner end of the first ferrule being ground and polished together with the first optical fiber with a predetermined inclination angle relative to a plane perpendicular to the optical axis of the first ferrule, while the outer end of the same is optically connected to a light source; preparing a second cylindrical ferrule having a second optical fiber with a sheath removed therefrom inserted through a center hole formed along a longitudinally extending optical axis thereof, the second optical fiber being immovably held in the center hole of the second ferrule with the aid of an adhesive, the inner end of the second ferrule being ground and polished together with the second optical fiber with the predetermined inclination angle relative to a plane perpendicular to the optical axis of the second ferrule, while the outer end of the same is optically connected to a power meter for measuring a light attenuation value of the light attenuating element; firmly fitting the first and second ferrules from the opposite sides of the light attenuating element into a cylindrical alignment sleeve serving as a holder for the light attenuating element with a predetermined distance kept between the inner end of the first ferrule and the inner end of the second ferrule, while measuring the light attenuation value of the light attenuating element in response to an optical signal output from the light source until the light attenuation value reaches a predetermined one with the predetermined distance kept therebetween; interrupting the fitting operation for the first and second ferrule to firmly hold the first and second ferrules in the alignment sleeve when it is confirmed by the power meter that the light attenuation value of the light attenuating element has reached the predetermined one; cutting the first and second optical fibers along the opposite outer surfaces of the first and second ferrules; and grinding and polishing the opposite outer surfaces of the first and second ferrules together with the first and second optical fibers to assume a predetermined contour.

Additionally, according to a fifth aspect of the present invention, there is provided an adaptor type stationary optical attenuator wherein the optical attenuator comprises a cylindrical main body of which opposite end parts are formed with a plurality of male threads around the outer peripheral surfaces thereof; an alignment sleeve immovably fitted into a longitudinally extending hole formed in the main body; a light attenuating element disposed in the intermediate region of a longitudinally extending hole formed in the alignment sleeve; a first optical connector plug to be threadably fitted onto one end part of the main body; and a second optical connector plug to be threadably fitted onto other end of the main body.

The light attenuating element is prepared in the form of a light attenuating element constructed in accordance with the first aspect of the present invention.

Alternatively, the light attenuating element may be prepared in the form of a light attenuating element constructed in accordance with the second aspect of the present invention.

It is preferable that each of the first and second optical connectors comprises a coupling nut having a plurality of female threads formed around the inner peripheral surface thereof to be threadably engaged with the male threads of the main body; a ferrule having an optical fiber with a sheath removed therefrom inserted through a center hole formed in the ferrule, the foremost end of the optical fiber being ground and polished together with the ferrule to assume a predetermined contour; and biasing means disposed between the bottom of the coupling nut and a flange portion at the intermediate part of the ferrule so as to allow the inner end of the optical fiber to come in contact with the outer end of an optical fiber with a sheath removed therefrom in the light attenuating element.

Usually, the biasing means is prepared in the form of a coil spring.

Furthermore, according to a sixth aspect of the present invention, there is provided an optical connector plug type optical attenuator wherein the optical attenuator comprises a coupling nut having a plurality of female threads formed around the inner peripheral surface thereof; a cylindrical ferrule received in the coupling nut, the ferrule having a first optical fiber with a sheath removed therefrom and a second optical fiber with a sheath removed therefrom forcibly inserted through a center hole formed along a longitudinally extending optical axis of the ferrule and immovably held therein with the aid of an adhesive, the inner ends of the first optical fiber and the second optical fiber being cut with a predetermined inclination angle relative to a plane perpendicular to the optical axis of the ferrule and spaced away from each other with a predetermined distance therebetween; biasing means disposed between the bottom of the coupling nut and a flange portion at the intermediate position of the ferrule; and a snap ring serving as a stopper disposed outside of the bottom of the coupling nut.

Also in this case, the biasing means is usually prepared in the form of a coil spring.

The inclination angle of each optical fiber relative to a plane perpendicular to the optical axis of the optical attenuator is set to eight degrees or more.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 2(a) is an illustrative view of an apparatus for producing a light attenuating element in accordance with a second embodiment of the present invention, particularly showing production steps;

FIG. 2(b) is a sectional side view of the light attenuating element which is produced by employing the apparatus shown in FIG. 2(a):

DESCRIPTION OF THE PREFERRED EMBODIMENTS

Now, the present invention will be described in detail hereinafter with reference to the accompanying drawings which illustrate preferred embodiments of the present invention.

Figure 1A:
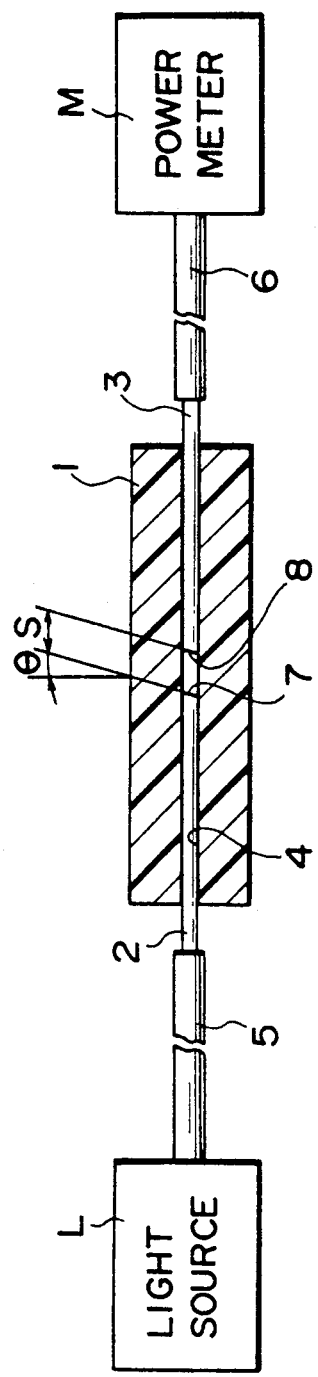
FIG. 1(a) is an illustrative view of an apparatus for producing a light attenuating element in accordance with a first embodiment of the present invention, particularly showing production steps.
Figure 1B:
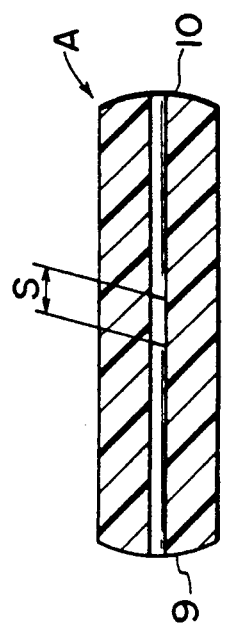
FIG. 1(b) is a sectional side view of the light attenuation element which is produced by employing the apparatus shown in FIG. 1(a)

First, a stationary type light attenuating element in accordance with a first embodiment of the present invention will be described below with reference to FIGS. 1(a) and 1(b) wherein FIG. 1(a) is a sectional side view of the light attenuating element, particularly illustrating the steps of producing the same and FIG. 1(b) is a sectional view of the light attenuating element which has been finished by way of the foregoing steps, particularly illustrating that optical fibers each having a sheath removed therefrom are cut at the opposite ends of a ferrule and the outer ends of the optical fibers are then ground and polished together with the ferrule.

A through hole 4 having a very small diameter is formed along the center axis of a cylindrical ferrule 1 so that a first optical fiber 2 with a sheath 5 removed therefrom and a second optical fiber 3 with a sheath 6 removed therefrom are inserted through the hole 4. After completion of the inserting operation, both the optical fibers 2 and 3 are immovably held in the hole 4 with the aid of an adhesive.

As is best seen in FIG. 1(a), the foremost end surfaces 7 and 8 of the optical fibers 2 and 3 are ground and polished with a predetermined inclination angle $\theta$ relative to a plane extending at a right angle relative to an optical axis of the light attenuating element. It is most acceptable that the inclination angle $\theta$ is set to eight degrees or more.

One end of the optical fiber 2, i.e., the left-hand end of the same as seen in the drawing is coupled to a light source L, while one end of the optical fiber 3, i.e., the right-hand end of the same is coupled to a power meter M for measuring a light attenuation value of the light attenuating element in response to an optical signal. Thereafter, the optical fibers 2 and 3 each coated with an adhesive are inserted into the hole 4 from the opposite ends of the ferrule 1. As the inserting operation is performed, an optical signal is transmitted from the light source L to the power meter M through both the optical fibers 2 and 3 and then the power meter M detects a light attenuation value of the light attenuating element in response to the optical signal. The inserting operation is continuously performed until a predetermined light attenuation value is attained with the light attenuating element. When it is confirmed that the predetermined light attenuation value is attained with the light attenuating element, the adhesive is cured so as to allow the optical fibers 2 and 3 to be immovably held in the hole 4.

Subsequently, the optical fibers 2 and 3 are cut along the opposite end surfaces of the ferrule 1. After completion of the cutting operation, the outermost cut ends of the optical fibers 2 and 3 are ground and polished together with the ferrule 1 to assume a predetermined contour, respectively.

FIG. 1(b) is a sectional side view of a light attenuating element A which has been finished by way of the aforementioned steps.

Next, a stationary type light attenuating element in accordance with a second embodiment of the present invention will be described below with reference to FIGS. 2(a) and 2(b) wherein FIG. 2(a) is a sectional side view of the light attenuating element, particularly illustrating the steps of producing the same using two ferrules and FIG. 2(b) is a sectional view of the light attenuating element which has been finished by way of the foregoing steps.

The light attenuating element designated by reference character B (see FIG. 2(b)) includes first and second ferrules 11 and 12, and center holes are formed through the ferrules 11 and 12 along their center axes. Optical fibers 13 and 14 each having a sheath removed therefrom are inserted through the center holes of the ferrules 11 and 12. After completion of the inserting operation, they are immovably held in the central holes of the ferrules 11 and 12 with the aid of an adhesive. Subsequently, one end surface of the ferrule 11, i.e., the left-hand end of the same as seen in the drawing is ground and polished together with the optical fiber 13 with a predetermined inclination angle $\theta$ relative to a plane extending at a right angle relative to the optical axis of the light attenuating element. Similarly, one end surface of the ferrule 12, i.e., the right-hand end surface of the same as seen in the drawing is ground and polished together with the optical fiber 14 with the same inclination angle $\theta$ as mentioned above. It is most acceptable that the inclination angle $\theta$ is set to eight degrees or more in the same manner as the first embodiment of the present invention.

A light source L is coupled to one end of the optical fiber 13, i.e., the left-hand end of the same as seen in the drawing, while a power meter M for measuring a light attenuation value of each optical signal is coupled to one end of the optical fiber 14, i.e., the right-hand end of the same. Subsequently, a ferrule 11 is firmly fitted into an alignment sleeve 15 from the left-hand side, while a ferrule 12 is likewise firmly fitted into the alignment sleeve 15 from the right-hand side. In addition, while the present light attenuation value is detected by the power meter M in response to an optical signal transmitted from the light source L, both the ferrules 11 and 12 are forcibly inserted further into the alignment sleeve 15 until a predetermined light attenuation value is attained. When it is confirmed that the predetermined attenuation value has been attained, the inserting operation is interrupted.

Subsequently, both the optical fibers 13 and 14 are cut along the outer end surfaces of the ferrules 11 and 12, and thereafter, the outer end surfaces of the ferrules 11 and 12 are ground and polished together with the optical fibers 13 and 14 so as to assume a predetermined contour, respectively.

FIG. 2(b) is a sectional view of a light attenuating element B which has been finished by way of the aforementioned steps.

Figure 3A:
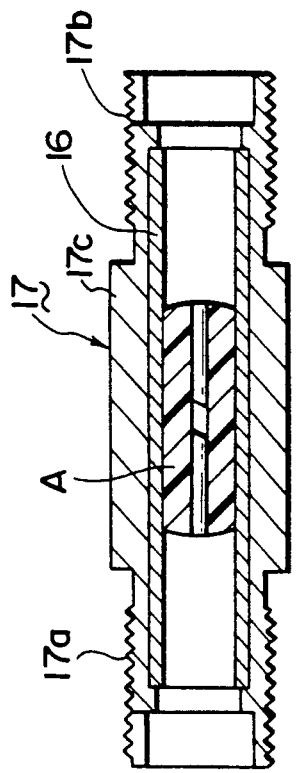
FIG. 3(a) is a sectional side view of an adaptor type stationary optical attenuator in accordance with a third embodiment of the present invention wherein a light attenuating element shown in FIG. 1(a) is incorporated in an alignment sleeve.
Figure 3B:
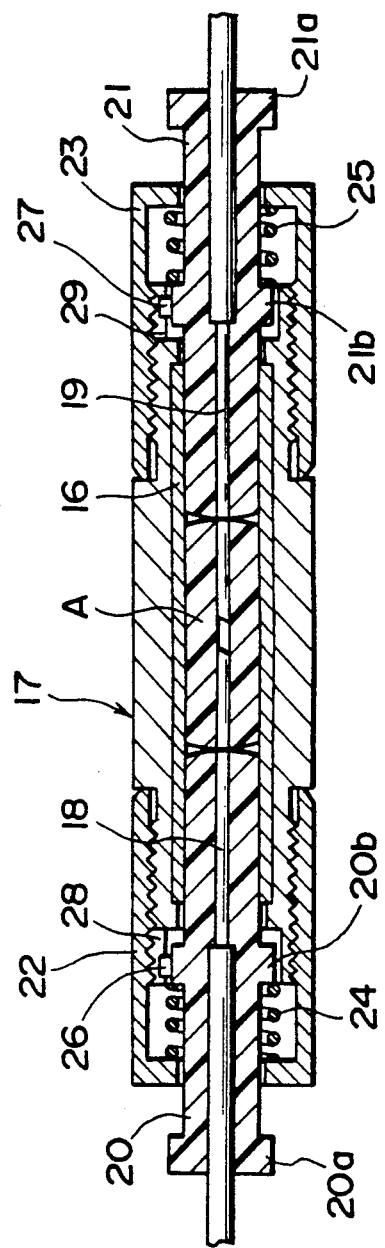
FIG. 3(b) is a sectional side view of an assembly of the optical attenuator shown in FIG. 3(a) with optical connector plugs wherein coupling nuts are threadably fitted onto a main body of the optical attenuator together with ferrules.

FIGS. 3(a) and 3(b) are a sectional view of an adaptor type stationary optical attenuator in accordance with a third embodiment of the present invention wherein the light attenuating element shown in FIG. 1(b) is incorporated in an alignment sleeve.

The optical attenuator includes a cylindrical main body 17 of which opposite end parts are machined to form a plurality of male threads 17a and 17b. However, an intermediate part 17c of the main body 17 having a certain axial length is kept unmachined. As shown in FIG. 3(a), an alignment sleeve 16 is substantially fixedly secured to the inner wall of the main body 17. The light attenuating element A as shown in FIG. 1(b) is detachably forcibly inserted into the middle part of the alignment sleeve 16 which has been fixedly secured to the main body 17.

FIG. 3(a) shows merely an example of the main body 17 for the optical attenuator, and it is obvious that the main body 17 may be designed in an arbitrary configuration properly corresponding to the configuration of an optical connector to be coupled to the optical attenuator.

FIG. 3(b) is a sectional view of an assembly of optical connector plugs threadably fitted onto the optical attenuator shown in FIG. 3(a).

The optical connector plugs are constructed of ferrule portions, coil springs 24 and 25, coupling nuts 22 and 23 and key slots 26 and 27 formed on the main body 17. The left-hand and right-hand ferrule portions are prepared such that optical fibers 18 and 19 each having a sheath removed therefrom are inserted through center holes of the ferrules 20 and 21 and then immovably held therein with the aid of an adhesive, and thereafter the outer end surfaces of the ferrules 20 and 21 are ground and polished together with the optical fibers 18 and 19.

The ferrule 20 includes flanges 20a and 20b, and a coil spring 24 is disposed between both the flanges 20a and 20b in a compressed state. Similarly, the ferrule 21 includes flanges 21a and 21b, and a coil spring 25 is disposed between both the flanges 21a and 21b in a compressed state. A plurality of female threads are formed along the cylindrical inner wall of each of coupling nuts 22 and 23. Thus, the coupling nut 22 is firmly fitted onto the left-hand end part of the main body 17 by threadable engagement of the female threads on the coupling nut 22 with the male threads on the main body 17 while the coil spring 24 is held between the bottom of the coupling nut 22 and the flange 20b. Similarly, the coupling nut 23 is firmly fitted onto the right-hand end part of the main body 17 by threadable engagement of the female threads on the coupling nut 23 with the male threads on the main body 17 while the coil spring 25 is held between the bottom of the coupling nut 23 and the flange 21b.

An assembling operation is performed such that the ferrule portions having the optical fibers 18 and 19 immovably held therein are inserted into an alignment sleeve 16 from the opposite sides of the same until the foremost end surfaces of the ferrule portions come in contact with the opposite end surfaces of a light attenuating element A, and thereafter, the coupling nuts 22 and 23 are threadably fitted onto the main body 17. After completion of the assembling operation, the optical fibers 18 and 19 are optically connected to each other with the light attenuating element A interposed therebetween. With such construction, an optical signal is transmitted from the optical fiber 18 side to the optical fiber 19 side and vice versa while light attenuation is accomplished by a predetermined quantity during passage of the optical signal through the light attenuating element A.

Figure 4:
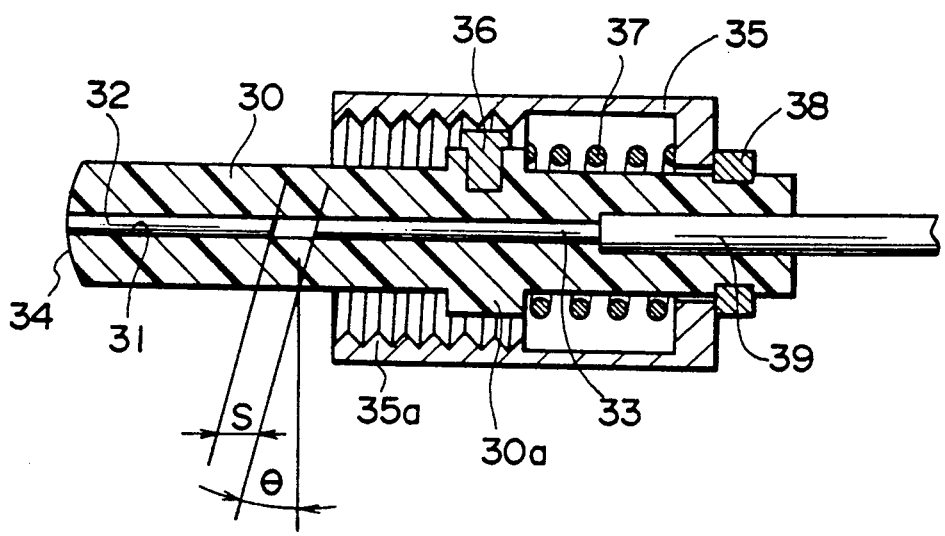
FIG. 4 is a sectional side view of an optical connector plug type stationary optical attenuator in accordance with a fourth embodiment of the present invention wherein a ferrule is constructed to exhibit a light attenuating function.
Figure 5A:
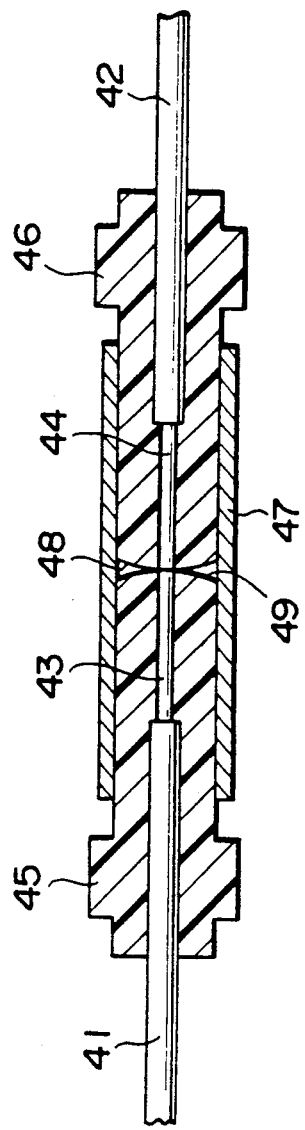
FIG. 5(a) is a sectional side view of a conventional stationary optical attenuator.
Figure 5B:
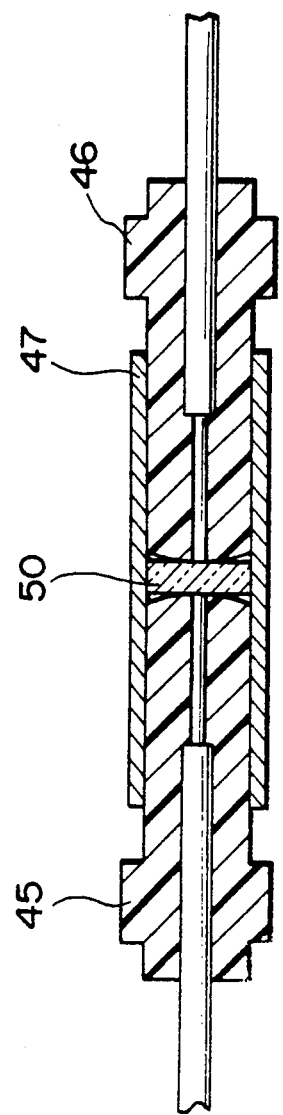
FIG. 5(b) is a sectional side view of another conventional stationary optical attenuator.

Next, FIG. 4 is a sectional side view of an optical connector plug type stationary optical attenuator in accordance with a fourth embodiment of the present invention wherein a ferrule has a light attenuating function so as to allow an optical connector plug itself to exhibit a light attenuating function.

A ferrule 30 has a center hole through which optical fibers 32 and 33 each having a sheath removed therefrom are inserted. The foremost ends of both the optical fibers 32 and 33 are spaced from each other by a distance S which is held therebetween while the fibers are cut with an inclination angle $\theta$ of eight degrees or more relative to a plane perpendicular to an optical axis of each optical fiber. One end of the optical fiber 32, i.e., the left-hand end of the same as seen in the drawing is cut along the outer end surface of the ferrule 30 and then ground and polished together with the ferrule 30 to assume a predetermined contour.

On the other hand, the optical fiber 33 is inserted through the center hole of the ferrule 30 until the foremost end of a sheath 39 collides with a stepped portion of the center hole. After completion of the inserting operation, the optical fiber 33 is immovably held in the center hole of the ferrule 30 with the aid of an adhesive.

A coil spring 37 is disposed between a flange 30a of the ferrule 30 and the bottom of a coupling nut 35 in a compressed state. As shown in the drawing, a plurality of female threads are formed along a cylindrical inner wall of the coupling nut 35 so as to allow the optical attenuator to be threadably coupled to an opponent optical connector (not shown). A snap ring 38 serving as a stopper is fitted around the ferrule 30 at the position behind the bottom of the coupling nut 35 so as to prevent the coupling nut 35 from being disconnected from the ferrule 30.

The present invention has been described above with respect to a single optical fiber type optical attenuator with reference to FIGS. 3(a) and 3(b) and FIG. 4. However, the present invention should not be limited only to this type. Alternatively, the present invention may equally be applied to an optical attenuator including a ribbon type optical fiber comprising an array of optical fibers.

As is apparent from the above description, according to the present invention, a light attenuating element is constructed in accordance with an air gap type light attenuating principle such that a gap, i.e., a hollow space is formed between the foremost ends of optical fibers in the center hole of a ferrule so as to attain a predetermined quantity of light attenuation in proportion with the axial length of the air gap, i.e., the distance between the foremost ends of the optical fibers arranged opposite to each other in the ferrule. In addition, various kinds of stationary optical attenuators are constructed by incorporating the light attenuating element in a main body or an optical connector plug. Consequently, the present invention offers the following advantageous effects.

In contrast with the conventional optical attenuator including a plate having surfaces each plated with a vaporized metal, the light attenuating characteristics of the optical attenuator of the present invention do not vary no matter how the optical attenuator is repeatedly attached to and detached from an opponent optical connector. Thus, the optical attenuator of the present invention has excellent durability irrespective of repeated attachment to and detachment from an opponent optical fiber.

Even when a flaw such as a scratch or the like arises on opposite end surfaces of a light attenuating element due to repeated contact with the foremost ends of opponent optical fibers, scratched or injured end surfaces of the light attenuating element can properly be cleaned and then repaired.

In addition, since a light attenuating function is attainable with a light attenuation element having optical fibers airtightly integrated with a ferrule, the light attenuating element is hardly adversely affected by exterior environmental factors such as moisture, vibration, shock or the like, and moreover, exhibits excellent stability and durability.

While the present invention has been described above with respect to four preferred embodiments thereof, it should of course be understood that the present invention should not be limited only these embodiments but various changes or modifications may be made without departure from the scope of the present invention as defined by the appended claims.

What is claimed is:

1. A method of producing a light attenuating element, comprising the steps of:

inserting a first optical fiber with a sheath removed therefrom through a center hole formed along a longitudinally extending optical axis of a cylindrical ferrule from one side of said ferrule, the inner end of said first optical fiber being cut with a predetermined inclination angle relative to a plane perpendicular to said optical axis of said ferrule, while the outer end of the first optical fiber is optically connected to a light source;

inserting a second optical fiber with a sheath removed therefrom through said center hole of said ferrule from an opposite end of said ferrule, the inner end of said second fiber being cut with said predetermined inclination angle and spaced from the inner end of said first optical fiber with a predetermined distance therebetween, while the outer end of the second optical fiber is optically connected to a power meter for measuring a light attenuation value of said light attenuating element;

measuring said light attenuation value of said light attenuating element with the aid of said power meter in response to an optical signal outputted from said light source so as to continue the inserting operation for said first and second optical fibers until said light attenuation value of said light attenuating element reaches a predetermined one;

interrupting the inserting operation for said first and second optical fiber to immovably hold said first and second optical fibers in said center hole of said ferrule with the aid of an adhesive when it is confirmed by said power meter that said light attenuation value has reached said predetermined one;

cutting said first and second optical fibers along the opposite outer surfaces of said ferrule; and grinding and polishing the opposite outer surfaces of said ferrule together with said first and second optical fibers to assume a predetermined contour.

2. The method as claimed in claim 1, wherein said inclination angle is set to eight degrees or more.

3. The method as claimed in claim 1, wherein said predetermined distance between the inner end of said first optical fiber and the inner end of said second optical fiber is determined so as to allow said light attenuating element to exhibit said predetermined light attenuation value.

4. The method as claimed in claim 1, wherein the opposite outer end surfaces of said ferrule are ground and polished together with said first and second optical fibers to exhibit a right angle relative to said optical axis of said ferrule, a predetermined inclination angle relative to the same or a convexly curved plane relative to the same.

5. The method as claimed in claim 1, wherein said ferrule is molded of pulverized quartz, pulverized alumina or pulverized zirconia each of which is sintered after completion of a molding operation.

6. A method of producing a light attenuating element, comprising the steps of:

preparing a first cylindrical ferrule having a first optical fiber with a sheath removed therefrom inserted through a center hole formed along a longitudinally extending optical axis thereof, said first optical fiber being immovably held in said center hole of said first ferrule with the aid of an adhesive, the inner end of said first ferrule being ground and polished together with said first optical fiber with a predetermined inclination angle relative to a plane perpendicular to said optical axis of said first ferrule, while the outer end of the first optical fiber is optically connected to a light source;

preparing a second cylindrical ferrule having a second optical fiber with a sheath removed therefrom inserted through a center hole formed along a longitudinally extending optical axis thereof, said second optical fiber being immovably held in said center hole of said second ferrule with the aid of an adhesive, the inner end of said second ferrule being ground and polished together with said second optical fiber with said predetermined inclination angle relative to a plane perpendicular to said optical axis of said second ferrule, while the outer end of the and optical fiber is optically connected to a power meter for measuring a light attenuation value of said light attenuating element;

firmly fitting said first and second ferrules from the opposite sides of said light attenuating element into a cylindrical alignment sleeve serving as a holder for said light attenuating element with a predetermined distance kept between the inner end of said first ferrule and the inner end of said second ferrule, while measuring said light attenuation value of said light attenuating element in response to an optical signal output from said light source until said light attenuation value reaches a predetermined one with said predetermined distance kept therebetween;

interrupting the fitting operation for said first and second ferrules to firmly hold said first and second ferrules in said alignment sleeve when it is confirmed by said power meter that said light attenuation value of said light attenuating element has reached said predetermined one;

cutting said first and second optical fibers along the opposite outer surfaces of said first and second ferrules; and grinding and polishing the opposite outer surfaces of said first and second ferrules together with said first and second optical fibers to assume a predetermined contour.

7. The method as claimed in claim 6, wherein said inclination angle is set to eight degrees or more.

8. The method as claimed in claim 6, wherein said predetermined distance between the inner end of said first ferrule and the inner end of said second ferrule is determined so as to allow said light attenuating element to exhibit said predetermined light attenuation value.

9. The method as claimed in claim 6, wherein the opposite outer end surfaces of said first and second ferrules are ground and polished together with said first and second optical fibers to exhibit a right angle relative to said optical axes of said first and second ferrules, a predetermined inclination angle relative to the same or a convexly curved plane relative to the same.

10. The method as claimed in claim 6, wherein each of said first and second ferrules is molded of pulverized quartz, pulverized alumina or pulverized zirconia each of which is sintered after completion of a molding operation.

11. An optical connector plug type optical attenuator comprising:
- a coupling nut having a plurality of female threads formed around an inner peripheral surface thereof;
- a cylindrical ferrule received in said coupling nut, said ferrule having a first optical fiber with a sheath removed therefrom and a second optical fiber with a sheath removed therefrom inserted through a center hole formed along a longitudinally extending optical axis of said ferrule and immovably held therein with the aid of an adhesive, the inner ends of said first optical fiber and said second optical fiber being cut with predetermined inclination angle relative to a plane perpendicular to said optical axis of said ferrule and spaced from each other with a predetermined distance therebetween, said predetermined distance allowing said optical attenuator to exhibit a predetermined light attenuation value;
- biasing means disposed between an inner end of said coupling nut and a flange portion at an intermediate portion of said ferrule; and
- a snap ring serving as a stopper disposed at the outside of said coupling nut.

12. The optical attenuator as claimed in claim 11, wherein said biasing means is a coil spring.

13. The optical attenuator as claimed in claim 11, wherein said inclination angle is set to eight degrees or more.

14. The optical attenuator as claimed in claim 11, wherein said ferrule is molded of pulverized quartz, pulverized alumina or pulverized zirconia each of which is sintered after completion of a molding operation.

15. A light attenuating element for use as an optical attenuator comprising:
- a cylindrical ferrule having a first end, a second end and a longitudinal optical axis, said ferrule having a center hole extending along said optical axis between said first and second ends;
- a first optical fiber having an inner end, an outer end and a sheath, said first optical fiber being immovably held by means of an adhesive within said center hole at the first end of said ferrule, the inner end of said first optical fiber being cut with a predetermined inclination angle relative to a plane perpendicular to the optical axis of said ferrule and the outer end of said first optical fiber being ground and polished together with the first end of said ferrule to assume a predetermined contour; and
- a second optical fiber having an inner end, an outer end and a sheath, said second optical fiber being immovably held by means of an adhesive within said center hole at the second end of said ferrule, the inner end of said second optical fiber being cut with said predetermined inclination angle relative to said plane so that it is parallel to the inner end of said first optical fiber and the outer end of said second optical fiber being ground and polished together with the second end of said ferrule to assume a predetermined contour, the inner end of said second optical fiber being spaced from the inner end of said first optical fiber by a predetermined distance thereby stably and fixedly attenuating light transmitted from one of said optical fibers to the other, the sheaths of said first and second optical fibers being removed from the portions thereof within said ferrule.

16. The light attenuating element as claimed in claim 15, wherein said inclination angle is at least eight degrees.

17. The light attenuating element as claimed in claim 15, wherein the predetermined distance between the inner end of said first optical fiber and the inner end of said second optical fiber provides a predetermined light attenuation value.

18. The light attenuating element as claimed in claim 15, wherein the first and second ends of said ferrule have surfaces which are ground and polished together with the outer ends of said first and second optical fibers to exhibit one of a right angle relative to said optical axis, a predetermined inclination angle relative to said optical axis and a convexly curved plane relative to said optical axis.

19. The light attenuating element as claimed in claim 15, wherein said ferrule is molded of pulverized quartz, pulverized alumina or pulverized zirconia each of which is sintered after completion of a molding operation.

20. An adaptor type stationary optical attenuator comprising;
- a cylindrical main body having a first end, a second end and a first longitudinally extending hole therein, said main body having a plurality of male threads formed around the outer peripheral surfaces of said first and second ends;
- an alignment sleeve immovably fitted within said first longitudinally extending hole, said alignment sleeve having a second longitudinally extending hole therein;
- a light attenuating element disposed in an intermediate region of said second longitudinally extending hole, said light attenuating element including
  - a first cylindrical ferrule having a first end, a second end and a longitudinal optical axis, said first ferrule having a center hole extending along said optical axis between said first and second ends;
  - a first optical fiber having an inner end, an outer end and a sheath, said first optical fiber being immovably held by means of an adhesive within said center hole at the first end of said first ferrule, the inner end of said first optical fiber being cut with a predetermined inclination angle relative to a plane perpendicular to the optical axis of said first ferrule and the outer end of said first optical fiber being ground and polished together with the first end of said first ferrule to assume a predetermined contour; and
  - a second optical fiber having an inner end, an outer end and a sheath, said second optical fiber being immovably held by means of an adhesive within said center hole at the second end of said first ferrule, the inner end of said second optical fiber being cut with said predetermined inclination angle relative to said plane so that it is parallel to the inner end of said first optical fiber and the outer end of said second optical fiber being ground and polished together with the second end of said first ferrule to assume a predetermined contour, the inner end of said second optical fiber being spaced from the inner end of said first optical fiber by a predetermined distance thereby stably and fixedly attenuating light transmitted from one of said optical fibers to the other, the sheaths of said first and second optical fibers being removed from the portions thereof within said first ferrule;

a first optical connector plug threadably fitted onto the first end of said main body, and a second optical connector plug threadably fitted onto the second end of said main body.

21. The optical attenuator as claimed in claim 20, wherein each of said first and second optical connector plugs comprises a coupling nut having a plurality of female threads formed around the inner peripheral surface thereof for threadable engagement with the male threads of said main body, a second ferrule having a second optical fiber with a sheath removed therefrom inserted through a center hole formed in said second ferrule, a foremost end of said second optical fiber being ground and polished together with said second ferrule to assume a predetermined contour, and biasing means disposed betwen an inner end of said coupling nut and a flange portion at an intermediate part of said second ferrule so as to allow the inner end of said second optical fiber to come into contact with the outer end of the first optical fiber with the sheath removed therefrom within said light attenuating element.

22. The optical attenuator as claimed in claim 21, wherein said biasing means is a coil spring.

* * * * *